(12) United States Patent
Dutto

(10) Patent No.: US 9,784,165 B2
(45) Date of Patent: Oct. 10, 2017

(54) METHOD OF OPERATING AN AFTERTREATMENT SYSTEM OF AN INTERNAL COMBUSTION ENGINE

(71) Applicant: GM GLOBAL TECHNOLOGY OPERATIONS LLC, Detroit, MI (US)

(72) Inventor: Andrea Dutto, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/418,866

(22) Filed: Jan. 30, 2017

(65) Prior Publication Data

US 2017/0218827 A1    Aug. 3, 2017

(30) Foreign Application Priority Data

Jan. 29, 2016    (GB) .................................. 1601819.4

(51) Int. Cl.
*F01N 9/00* (2006.01)
*B60W 30/08* (2012.01)
*F01N 3/035* (2006.01)

(52) U.S. Cl.
CPC ............. *F01N 9/002* (2013.01); *B60W 30/08* (2013.01); *F01N 3/035* (2013.01);
(Continued)

(58) Field of Classification Search
CPC ................................. F01N 3/02; F01N 3/021; F01N 3/023–3/035; F01N 9/002; F01N 2410/04; F01N 2410/08; F01N 2430/00–2430/10; F01N 2550/04; F01N 2550/12; F02D 41/027; F02D 2200/701; B60T 7/22; B60T 2201/022; B60W 30/08; B60W 30/085; B60W 30/09; B60W 30/095; B60W 30/0953; B60W 30/0956; B60W 2550/10; G08G 1/16–1/168; B60Y 2300/08–2300/0954; G01S 13/931; G01S 2013/9314–2013/9396; B60Q 9/008
(Continued)

(56) References Cited

U.S. PATENT DOCUMENTS

| 9,551,250 B2 | 1/2017 | Morishima et al. |
| 2002/0091479 A1 * | 7/2002 | Maruko .................... B60T 7/22 701/96 |

(Continued)

FOREIGN PATENT DOCUMENTS

DE    102009036720 A1    2/2011

OTHER PUBLICATIONS

Great Britain Patent Office, Great Britain Search Report for Great Britain Application No. 1601819.4, dated Mar. 4, 2016.

*Primary Examiner* — Mark Laurenzi
*Assistant Examiner* — Mickey France
(74) *Attorney, Agent, or Firm* — Lorenz & Kopf LLP

(57) ABSTRACT

A method is disclosed for operating an aftertreatment system having a diesel particulate filter of an internal combustion engine of an automotive system. A regeneration event of the diesel particulate filter is started. The presence of an object ahead of the automotive system is detected. A value of a deceleration that the automotive system should perform in order to avoid a collision with the object is determined. A temperature of the diesel particulate filter is reduced if the value of the deceleration is greater than a first predetermined threshold value.

5 Claims, 3 Drawing Sheets

(52) U.S. Cl.
CPC ...... *F01N 2610/03* (2013.01); *F01N 2900/04* (2013.01); *F01N 2900/12* (2013.01)

(58) Field of Classification Search
USPC .......... 340/435; 701/301; 60/273, 274, 277, 60/285, 286, 287, 289, 290, 293, 295, 60/297, 311, 320
See application file for complete search history.

(56) References Cited

U.S. PATENT DOCUMENTS

2004/0103654 A1\* 6/2004 Ohtake .................. F01N 3/023
                                                                         60/295
2012/0023910 A1     2/2012 Parrish et al.

\* cited by examiner

METHOD OF OPERATING AN AFTERTREATMENT SYSTEM OF AN INTERNAL COMBUSTION ENGINE

CROSS-REFERENCE TO RELATED APPLICATION

This application claims priority to Great Britain Patent Application No. 1601819.4, filed Jan. 29, 2016, which is incorporated herein by reference in its entirety.

TECHNICAL FIELD

The present disclosure pertains to a method of operating an aftertreatment system of an internal combustion, in particular an aftertreatment system provided with a diesel particulate filter (DPF).

BACKGROUND

It is well known that exhaust gas aftertreatment systems of internal combustion engines may be equipped with, among other aftertreatment devices, a diesel particulate filter (DPF) that collects liquid and solid particles, soot particles, in a porous, adsorbent substrate structure while allowing exhaust gases to flow through. The efficiency of a DPF may be maintained either by replacing the component or by a periodic cleaning or regeneration event, but in order to avoid service interruptions, a regeneration event is generally preferred.

A (DPF) regeneration event may be operated introducing very high heat into the aftertreatment system, creating a condition whereby the soot particles contained into the DPF are burned (oxidized). Since the burned soot particles contribute to increase the temperature inside the DPF, a regeneration event shall be performed frequently enough to avoid excessive temperatures during cleaning, but not so frequently as not to penalize fuel consumption and oil dilution.

Due to the high thermal gradients and temperature peaks produced within the DPF during a (DPF) regeneration event, a need exists of a method of operating the aftertreatment system that prevents further increasing of the temperature within the DPF when the engine operating conditions are modified during the (DPF) regeneration event.

SUMMARY

An embodiment of the disclosure provides a method of operating an aftertreatment system including a diesel particulate filter of an internal combustion engine of an automotive system. When a regeneration event of the diesel particulate filter is started, the presence of an object ahead of the automotive system is detected. A value of a deceleration that the automotive system should perform in order to avoid a collision with the object is determined. A temperature of the diesel particulate filter is reduced if the value of the deceleration is greater than a first predetermined threshold value. In this way is possible to increase efficiency and safety of a diesel particulate filter by predicting a situation where the risk of a malfunction of the diesel particulate filter is extremely high and where timing is a key factor, for example in a drop to idle condition of the internal combustion engine.

According to another aspect of the present disclosure, a value of a distance between the automotive system and the object and a value of a current speed of the automotive system is determined. A rate of distance between the automotive system and the object is also determined. The value of the deceleration is calculated on the basis of the distance value, the current speed value and the rate of distance value. In this way, it is possible to take advantage of an automotive system related technology, which normally supports a driver, to predict the risk that a predetermined internal combustion engine behavior occurs and safely operating an aftertreatment system of the automotive system accordingly.

According to another embodiment of the present disclosure, the generation of output signals may include decreasing a predetermined threshold value of temperature control set point of the diesel particulate filter, if the value of the deceleration is greater than the first predetermined threshold value but smaller than a second predetermined threshold value. In this way it is possible to set up a strategy of the regeneration event of the diesel particulate filter which increases the rate of the regeneration events, leading to a lower fuel consumption and a lower oil dilution.

According to a further aspect of the present disclosure, the reduction of the value of the temperature inside the diesel particulate filter may include at least one of the following: reducing an amount of oxygen ($O_2$) concentration in exhaust gases flowing in the diesel particular filter; interrupting an injection of hydrocarbons into an oxidation catalyst of the internal combustion engine; and increasing a value of idle speed of the internal combustion engine. In this way, it is possible to prevent, during a regeneration event of the diesel particulate filter, a production of high thermal gradients and temperature peaks within the diesel particulate filter due to a specific condition of the internal combustion engine.

According to a further aspect of the present disclosure, the method may further include determining a value of acceleration of the automotive system, and restoring the temperature inside the diesel particulate filter if the value of the acceleration of the automotive system is equal or greater than zero. In this way, it is possible to predictively control the regeneration event of a diesel particulate filter according to information related to the object ahead of the automotive system.

The proposed solution, achieving basically the same effects of the method described above, may be carried out with the help of a computer program in the form of a non-transitory computer readable medium having a program-code, when run on a computer, is configured to carry out the method described above, and in the form of a computer program product including the computer program.

A further embodiment of the disclosure provides an apparatus for operating an aftertreatment system including a diesel particulate filter of an internal combustion engine. The apparatus is configured to start a regeneration event of the diesel particulate filter, detect the presence of an object ahead of the automotive system, determine a value of a deceleration that the automotive system should perform in order to avoid a collision with the object, and reduce a temperature of the diesel particulate filter if the value of the deceleration is greater than a first predetermined threshold value. In this way is possible to increase efficiency and safety of a diesel particulate filter, predicting a situation where the risk of a malfunction of the diesel particulate filter is extremely high and where timing is a key factor, for example in a drop to idle condition of the internal combustion engine.

According to another aspect of the present disclosure, the apparatus is further configured to determine a value of a distance between the automotive system and the object, determine a value of a current speed of the automotive system, determine a rate of distance between the automotive system and the object, and calculate the value of the deceleration on the basis of the distance value, the current speed value and the rate of distance value. In this way, it is possible to take advantage of an automotive system related technology, which normally supports a driver, to predict the risk that a predetermined internal combustion engine behavior occurs and thus safely operating an aftertreatment system of the automotive system.

According to another embodiment of the present disclosure, the apparatus may be configured to decrease a predetermined threshold value of temperature control set point of the diesel particulate filter, if the value of the deceleration is greater than the first predetermined threshold value but smaller than a second predetermined threshold value. In this way it is possible to set up a strategy of the regeneration events of the diesel particulate filter which increases the rate of the regeneration events, leading to a lower fuel consumption and a lower oil dilution.

According to a further aspect of the present disclosure, the apparatus may further be configured to reduce an amount of oxygen ($O_2$) concentration in exhaust gases flowing in the diesel particular filter, interrupt an injection of hydrocarbons into an oxidation catalyst of the internal combustion engine, and/or increase a value of idle speed of the internal combustion engine. In this way, it is possible to prevent, during a regeneration event of the diesel particulate filter, a production of high thermal gradients and temperature peaks within the diesel particulate filter due to a specific condition of the internal combustion engine.

According to a further aspect of the present disclosure the apparatus may further be configured to determine a value of acceleration of the automotive system, and restore the temperature inside the diesel particulate filter if the value of the acceleration of the automotive system is equal or greater than zero. In this way, it is possible to predictively control the regeneration event of a diesel particulate filter according to information related to the object ahead of the automotive system.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
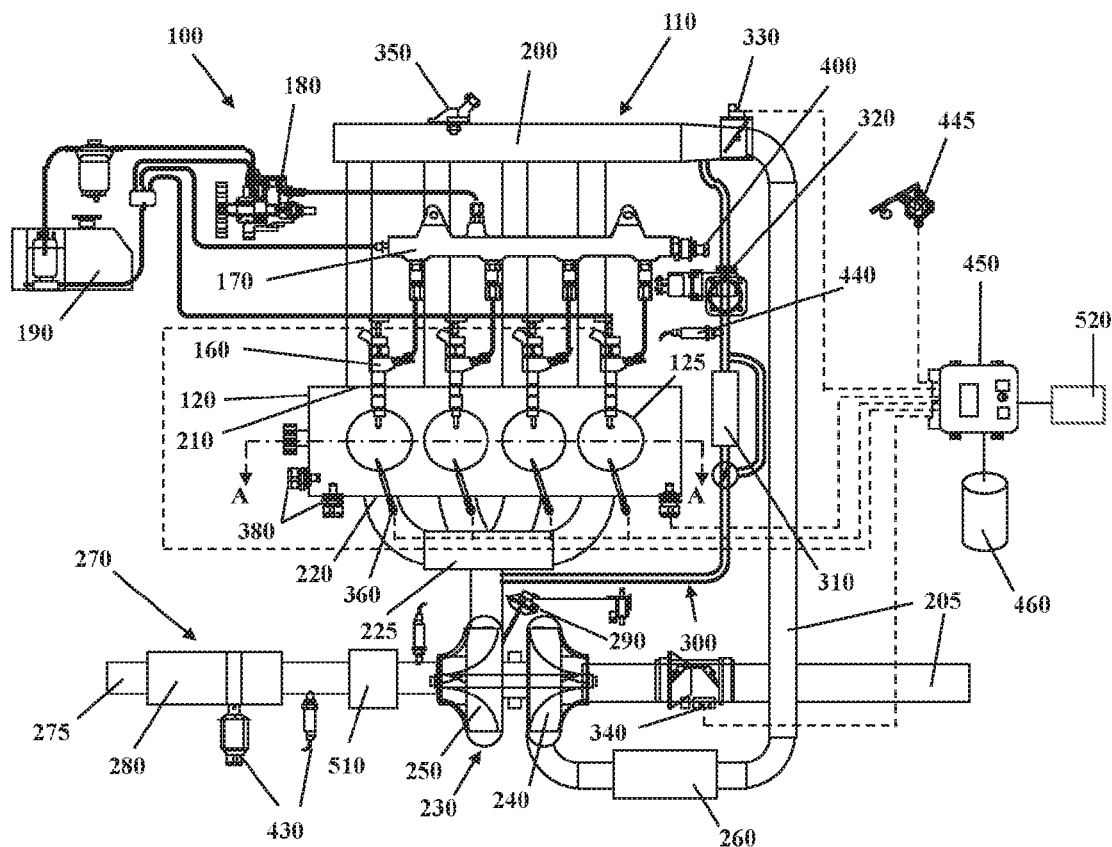
FIG. 1 shows an automotive system.
Figure 2:
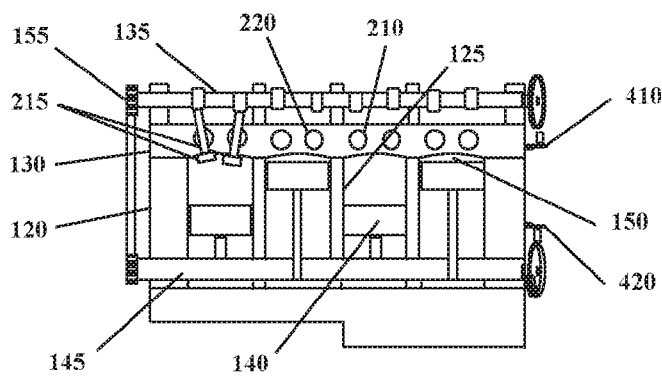
FIG. 2 is a cross-section of an internal combustion engine belonging to the automotive system of FIG. 1.
Figure 3:
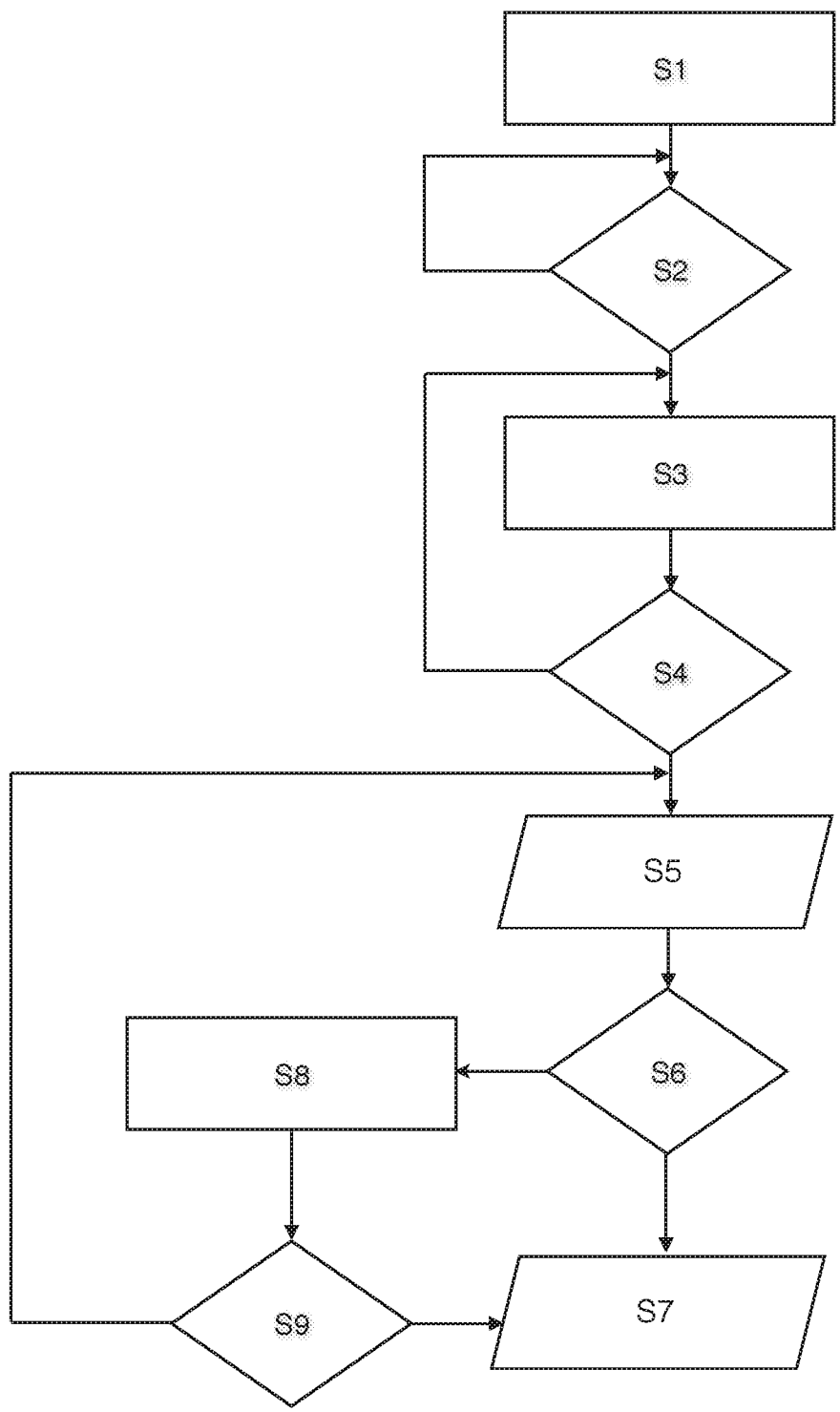
FIG. 3 is a flowchart of a method of operating the aftertreatment system of FIG. 1, according to an embodiment of the present disclosure.

Some embodiments may include an automotive system 100, as shown in FIGS. 1 and 2, that includes an internal combustion engine (ICE) 110 having a cylinder block 120 defining at least one cylinder 125 having a piston 140 coupled to rotate a crankshaft 145. A cylinder head 160 cooperates with the piston 140 to define a combustion chamber 150.

A fuel and air mixture (not shown) is disposed in the combustion chamber 170 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increases the pressure of the fuel received from a fuel source 190.

Each of the cylinders 125 has at least two valves 230, actuated by a camshaft 135 rotating in time with the crankshaft 145. The valves 215 selectively allow air into the combustion chamber 150 from the intake port 210 and alternately allow exhaust gases to exit through an exhaust port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the amount of flow of air into the intake manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon absorbers, selective catalytic reduction (SCR) systems, and particulate filters, in particular a Diesel Particulate Filter (DPF) 510. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

Other embodiments may include hydrocarbon injectors (HCI) which inject hydrocarbons, for example diesel fuel, into the oxidation catalyst in order to raise the temperature of the oxidation catalyst as well as the value of temperature of the exhaust gases.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an ASIC, a CD or the like.

Instead of an ECU 450, the automotive system 100 may have a different type of processor to provide the electronic logic, e.g. an embedded controller, an on-board computer, or any processing module that might be deployed in the vehicle.

The ECU 450 may receive input signals from one or more additional sensors and/or devices associated with the automotive system 100. The sensors include, but are not limited to, object-detecting devices 520, for example a radar or a laser device, configured to detect the presence and the distance of an object ahead of the automotive system 100, for example a preceding vehicle or an obstacle. The devices include, but are not limited to a space-based navigation system, for example a Global Positioning System (GPS) device, or a Global Navigation Satellite System (GNSS), configured to determine the location of the automotive system 100 on a road. Both devices and sensors are also configured to generate output signals in proportion to the distance of the automotive system 100 from the object.

According to an embodiment of the present disclosure, the ECU 450 may be configured to execute (block S1) a regeneration event of the DPF 510, by operating, for example, a plurality of fuel late-injections into cylinders 125 of the ICE 110. As a fuel late-injection is intended an injection of fuel by the fuel injector 160 into the combustion chamber 150 of the ICE 110, performed after the Top Dead Center (TDC) of the piston. In particular, the ECU 450 may be configured to perform a plurality of post-injections into cylinders 125 of the ICE 110. As a fuel post-injection is intended a fuel late-injection which is performed by the fuel injector 160 after the opening of the exhaust ports 220, so that the post-injected fuel quantity actually burns inside the oxidation catalysts, highly increasing the temperature in the DPF 510 and creating a condition whereby the soot particles contained in the DPF 510 are burned.

The ECU 450 may be further configured to determine (block S2) if a preceding vehicle or obstacle has been detected by the object-detecting devices 520 based on the input signals received by the object-detecting devices 520.

The ECU 450 may be further configured to determine (block S3) a value of the distance from the preceding vehicle or obstacle, a value of the current speed of the automotive system 100, a rate of distance from the vehicle or obstacle, and/or a value of the current acceleration and/or deceleration of the automotive system 100. The rate of distance is considered as the amount of distance per unit of time between the automotive system 100 and the preceding vehicle or obstacle. The rate of distance is particular useful in all those situations in which the preceding vehicle or obstacle is moving at a predetermined speed, so that the relative distance per unit of time between the automotive system 100 and the preceding vehicle or obstacle depends from the speed of both of them.

The ECU 450 may be further configured to determine (block S3) a value of a deceleration that the automotive system 100 should perform in order to avoid a collision with the object. The value of the deceleration may be calculated on the basis of the distance value, the current speed value and the rate of distance value previously determined.

The ECU 450 may be further configured to determine (block S4) if the value of the deceleration is greater than a first predetermined threshold value. The first predetermined threshold values of deceleration of the automotive system 100 may be a value of deceleration which leads the automotive system 100 into a drop to idle condition, and may be a value predetermined during experimental activities and stored in the memory system.

In a drop to idle condition the ICE 110 goes in a short period of time from a high speed—engine torque operating point to a very low speed—engine torque operating point, i.e. drops to idle, so that a strong and fast deceleration of the automotive system 100 is obtained. The drop to idle condition of the ICE 110 increases the amount of oxygen ($O_2$) concentration in the exhaust gases and decreases the flow rate of the exhaust gases in a short period of time.

If a drop to idle condition occurs during a (DPF) regeneration event, the high amount of oxygen, leading to an uncontrolled burning of the soot contained in the DPF 510, and the low flow rate of the exhaust gases may both produce high thermal gradients and temperature peaks value within the DPF 510, exceeding the thermal limits value of the DPF 510.

Thus, if the value of the deceleration is greater than the first predetermined threshold value, the ECU 450 may be further configured to generate (block S5) output signals to various control devices in order to reduce the value of the temperature inside the DPF 510.

For example, the ECU 450 may be configured to generate output signals to the exhaust gas recirculation (EGR) system 300. In particular, the ECU 450 may be configured to generate output signals to the EGR cooler 310 to reduce the value of temperature of the exhaust gases in the exhaust pipe 275, and to the EGR valve 320 to reduce the amount of oxygen ($O_2$) concentration in the exhaust gases and thus in the DPF 510. The ECU 450 may be further configured to generate output signals to the throttle body 330 to decrease the amount of flow of air into the intake manifold 200 and, thus, to reduce the amount of oxygen ($O_2$) concentration in the exhaust gases.

The ECU may be further configured to receive input signals from a sensor configured to generate signals in proportion to the amount of oxygen ($O_2$) concentration measured at a DPF inlet. Based on the input signals, thus based on the amount of oxygen ($O_2$) concentration measured and/or estimated at the DPF inlet, the ECU 450 may be configured to modify the output signals to the EGR cooler 310 and/or to the EGR valve 320 and/or to the throttle body 330.

The ECU 450 may be further configured to generate output signals to the hydrocarbon injectors (HCI) to interrupt the injection of hydrocarbons into the oxidation catalyst reducing the value of temperature of the exhaust gases.

The ECU 450 may be further configured to increase the value of idle speed of the ICE 110. The idle speed of the ICE 110 is a predetermined threshold value of rotational speed the ICE 110 runs on when it is uncoupled to the drivetrain and the throttle body 330 is in its idle position. The predetermined threshold values of the idle speed may be a minimum value of idle speed, and may be a value predetermined during experimental activities performed on a test bench and stored in the memory system. An increased value of idle speed increases the value of the flow rate of exhaust gases in the exhaust pipe 275 and thus in the DPF 510, decreasing the value of temperature inside the DPF 510.

The ECU 450 may be further configured to generate output signals to the fuel injectors 160 to interrupt or to limit fuel post-injections into the combustion chamber 150 of the ICE 110. The interruption or the limitation of the fuel post-injections interrupts or limits the fuel quantity actually burned inside the oxidation catalysts, thus decreasing the value of temperature inside the DPF 510.

The ECU 450 may be further configured to determine (block S6) if the preceding vehicle or obstacle is still detected by the object-detecting devices 520.

If the preceding vehicle or obstacle is no longer detected by the object-detecting devices 520, it is assumed that a collision with the preceding vehicle or obstacle has been avoided, thus the ECU 450 may be further configured to generate (block S7) output signals to the various control devices in order to restore their normal operative conditions, and thus to restore the temperature of the DPF 510.

If the preceding vehicle or obstacle is still detected by the object-detecting devices 520, the ECU 450 may be further configured to determine (block S8) a value of acceleration of the automotive system 100. The value of the acceleration may be calculated on the basis of the current speed of the automotive system 100, and/or a value of the current acceleration of the automotive system 100.

The ECU 450 may be further configured to determine (block S9) if the value of the acceleration of the automotive system 100 is equal or greater than zero. If the value of the acceleration of the automotive system 100 is equal or greater than zero, it is assumed that a collision with the preceding vehicle or obstacle has been avoided, thus the ECU 450 may be further configured to generate (block S7) output signals to the various control devices in order to restore their normal operative conditions, and, thus, to restore the temperature of the DPF 510.

For example, the ECU 450 may be configured to generate output signals to the EGR cooler 310 to restore the value of temperature of the exhaust gases in the exhaust pipe 275 and to the EGR valve 320 to restore the amount of oxygen ($O_2$) concentration in the exhaust gases and thus in the DPF 510. The ECU 450 may be further configured to generate output signal also to the throttle body 330 to restore the amount of flow of air into the intake manifold 200.

The ECU 450 may be further configured to generate output signals to the hydrocarbon injectors (HCI) to restore the injection of hydrocarbons into the oxidation catalyst increasing the value of temperature of the exhaust gases.

The ECU 450 may be further configured to restore the value of idle speed of the ICE 110.

The ECU 450 may be further configured to generate output signals to the fuel injectors 160 to restore the fuel post-injections into the combustion chamber 150 of the ICE 110 and, thus, restarting the regeneration event.

If the value of the acceleration of the automotive system 100 is not equal or greater than zero, it is assumed that a collision with the preceding vehicle or obstacle may still occur, thus the ECU 450 may be further configured to generate (block S5) output signals to the various control devices.

Figure 4:
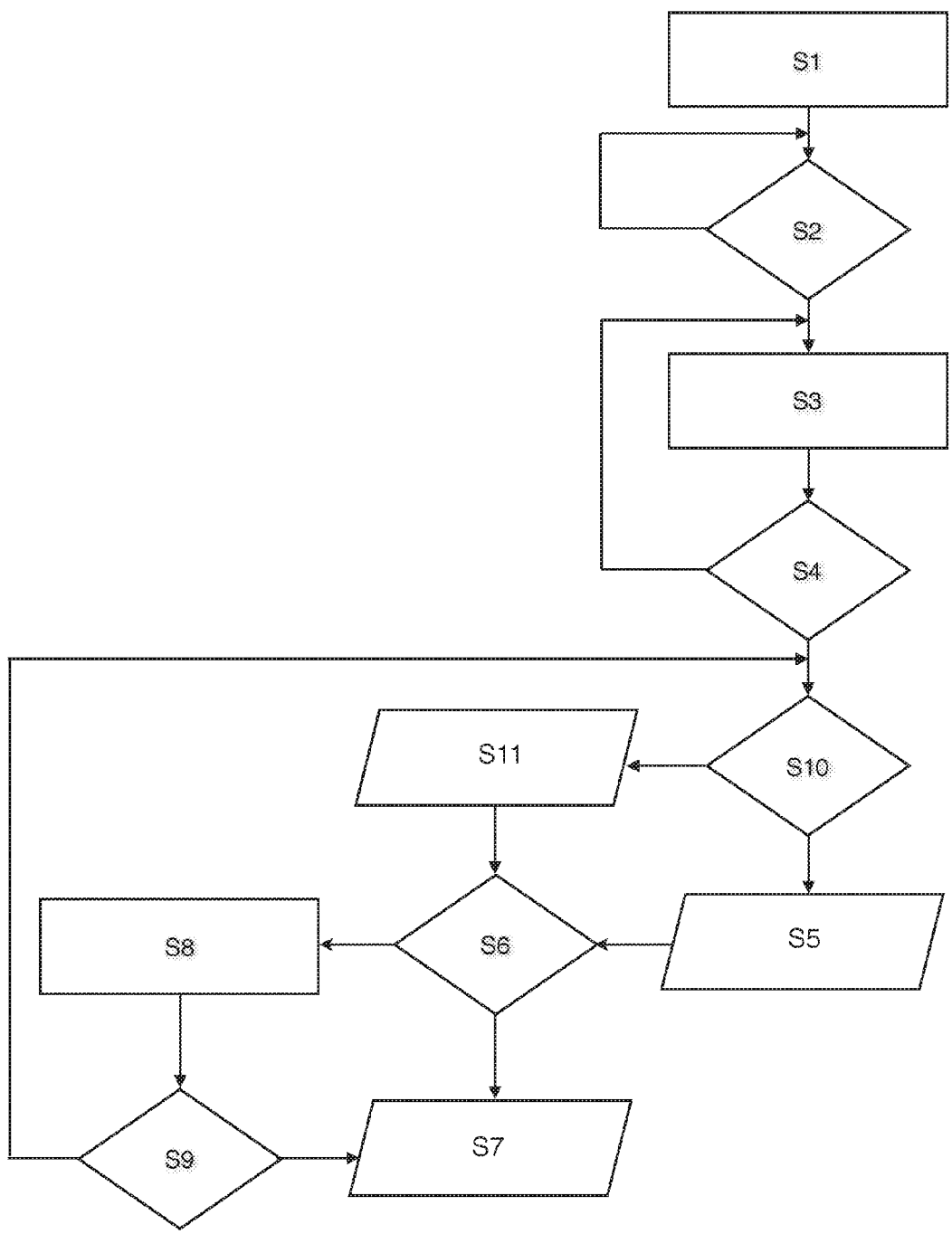
FIG. 4 is a flowchart of another embodiment of the method of operating the aftertreatment system of FIG. 1, according to a further embodiment of the present disclosure.

According to another embodiment of the present disclosure, shown in FIG. 4, the ECU 450 may be configured to execute (block S1) a regeneration event of the DPF 510, as previously described. The ECU 450 may be further configured to determine (block S2) if a preceding vehicle or obstacle has been detected by the object-detecting devices 520 based on the input signals received by the object-detecting devices 520, as previously described. The ECU 450 may be further configured to determine (block S3) the value of the distance from the preceding vehicle or obstacle, the rate of distance from the vehicle or obstacle, the value of the current speed of the automotive system 100, and the value of the current acceleration and/or deceleration rate of the automotive system 100, as previously described.

The ECU 450 may be further configured to determine (block S3) a value of a deceleration that the automotive system 100 should perform in order to avoid a collision with the object. The value of the deceleration may be calculated on the basis of the distance value, the current speed value and the rate of distance value previously determined.

The ECU 450 may be further configured to determine if the value of the deceleration of the automotive system 100 is greater or smaller than different predetermined threshold values. Each of the predetermined threshold values of deceleration of the automotive system 100 may be different minimum values of deceleration to avoid an upcoming collision with the preceding vehicle or obstacle. Each of the predetermined threshold values may or may not be a value of deceleration which leads the automotive system 100 into a drop to idle condition, and all them may be values predetermined during experimental activities and stored in the memory system.

For example, the first predetermined threshold value of deceleration of the automotive system 100 may be a value of deceleration which leads the automotive system 100 to a slow and moderate increase of the value of deceleration to minimize the risks of an upcoming collision with the preceding vehicle or obstacle. The second predetermined threshold value of deceleration of the automotive system 100 may be a value of deceleration which leads the automotive system 100 into a drop to idle condition.

Thus, the ECU 450 may be further configured to determine (block S4) if the value of the deceleration is greater than a first predetermined threshold value and to determine (block S10) if the value of the deceleration is smaller than a second predetermined threshold value.

Thus, if the value of the deceleration is greater than the first predetermined threshold value but smaller than the second predetermined threshold value, the ECU 450 may be further configured to generate (block S11) output signals to decrease a value of a temperature control set point of the DPF 510. The temperature control set point of the DPF may be the minimum value of temperature of the exhaust gases upstream the DPF 510 to start a regeneration event of the DPF 510, and may be a value predetermined during experimental activities performed on a test bench and stored in the memory system.

The ECU 450 may be further configured to increase a predetermined threshold value of amount of soot stored in the DPF 510 so as to increase the period of time during which a regeneration request may occur, decreasing the fuel consumption and decreasing oil dilution. The predetermined threshold value of amount of soot stored in the DPF 510 may be a value predetermined during experimental activities performed on a test bench and stored in the memory system.

The ECU 450 may be further configured to determine (block S6) if the preceding vehicle or obstacle is still detected by the object-detecting devices 520.

If the preceding vehicle or obstacle is no more detected by the object-detecting devices 520, it is assumed that a collision with the preceding vehicle or obstacle has been avoided, thus the ECU 450 may be further configured to generate (block S7) output signals to the various control devices in order to restore their normal operative conditions.

If the preceding vehicle or obstacle is still detected by the object-detecting devices 520, the ECU 450 may be further configured to determine (block S8) a value of acceleration of the automotive system 100. The value of the acceleration may be calculated on the basis of the current speed of the automotive system 100, and/or a value of the current acceleration of the automotive system 100.

The ECU 450 may be further configured to determine (block S9) If the value of the acceleration of the automotive system 100 is equal or greater than zero.

If the value of the acceleration of the automotive system 100 is equal or greater than zero, it is assumed that a collision with the preceding vehicle or obstacle has been avoided, thus the ECU 450 may be further configured to generate (block S7) output signals to the various control devices in order to restore their normal operative conditions.

If the value of the deceleration is greater than the first predetermined threshold value and greater also than the second predetermined threshold value, the ECU 450 may be further configured to generate (block S5) all the output signals to the various control devices as previously described, in order to reduce as much as possible the value of the temperature inside the DPF 510, reducing the amount of oxygen ($O_2$) concentration in the exhaust gases flowing into the DPF 510, reducing the value of temperature of the exhaust gases, and keeping the value of flow of the exhaust gases as low as possible. The ECU 450 may be further configured to increase the value of idle speed of the ICE 110 and to generate output signals to the fuel injectors 160 to interrupt fuel post-injections into the combustion chamber 150 of the ICE 110, as previously described.

The ECU 450 may be further configured to determine (block S6) if the preceding vehicle or obstacle is still detected by the object-detecting devices 520.

If the preceding vehicle or obstacle is no more detected by the object-detecting devices 520, it is assumed that a collision with the preceding vehicle or obstacle has been avoided, thus the ECU 450 may be further configured to generate (block S7) output signals to the various control devices in order to restore their normal operative conditions, and, thus, to restore the temperature of the DPF 510.

If the preceding vehicle or obstacle is still detected by the object-detecting devices 520, the ECU 450 may be further configured to determine (block S8) a value of acceleration of the automotive system 100. The value of the acceleration may be calculated on the basis of the current speed of the automotive system 100, and/or a value of the current acceleration of the automotive system 100.

The ECU 450 may be further configured to determine (block S9) if the value of the acceleration of the automotive system 100 is equal or greater than zero.

If the value of the acceleration of the automotive system 100 is equal or greater than zero, it is assumed that a collision with the preceding vehicle or obstacle has been avoided, thus the ECU 450 may be further configured to generate (block S7) output signals to the various control devices in order to restore their normal operative conditions, and, thus, to restore the temperature of the DPF 510.

Thanks to the above described method it is also possible to increase the control of a regeneration event of a DPF 510 in an automotive system 100 including object-detecting sensors and/or devices 520. Basing on the information received by the ECU 450 from the object-detecting sensors and/or devices 520, it is possible to adopt different DPF regeneration strategies. For example, in low-risk situations, i.e. when no objects are detected or where the deceleration values are less than the first predetermined threshold value, it is possible to increase the efficiency of the DPF 510 with a reduction of the regeneration event frequency. In high-risk situation, i.e. when an upcoming drop to idle condition is determined, it is possible to increase the safety margins of the DPF 510 reducing the temperature of the DFP 510 before that the drop to idle condition occurs.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating an aftertreatment system of an internal combustion engine of an automotive system having a diesel particulate filter, the method comprising:
    starting a regeneration event of the diesel particulate filter;
    detecting the presence of an object ahead of the automotive system;
    determining a value of a deceleration that the automotive system should perform in order to avoid a collision with said object, wherein the determining the value of the deceleration includes determining a value of a distance between the automotive system and said object; determining a value of a current speed of the automotive system; determining a rate of distance between the automotive system and said object; and calculating the value of the deceleration based on the distance value, the current speed value and the rate of distance value; and
    reducing an internal temperature of the diesel particulate filter when the value of the deceleration is greater than a first predetermined threshold value, wherein the reducing the internal temperature of the diesel particulate filter comprises decreasing a predetermined threshold value of a temperature control set point of the diesel particulate filter when the value of the deceleration is greater than the first predetermined threshold value but smaller than a second predetermined threshold value.

2. The method according to claim 1, wherein reducing an internal temperature of the diesel particulate filter when the value of the deceleration is greater than the second predetermined threshold value comprises at least one of the following:
    reducing an amount of oxygen concentration in exhaust gases flowing in the diesel particular filter;
    interrupting an injection of hydrocarbons into an oxidation catalyst of the internal combustion engine; and
    increasing a value of idle speed of the internal combustion engine.

3. The method according to claim 2, further comprising:
    determining a value of acceleration of the automotive system; and
    restoring the temperature inside the diesel particulate filter when the value of the acceleration of the automotive system is equal or greater than zero.

4. A non-transitory computer readable medium comprising a computer program having program code configured, when run on a computer, to:
    start a regeneration event of the diesel particulate filter;
    detect the presence of an object ahead of the automotive system;
    determine a value of a deceleration that the automotive system should perform in order to avoid a collision with said object, wherein the value of the deceleration is determined by determining a value of a distance between the automotive system and said object; determining a value of a current speed of the automotive system; determining a rate of distance between the automotive system and said object; and calculating the value of the deceleration based on the distance value, the current speed value and the rate of distance value; and
    reduce an internal temperature of the diesel particulate filter when the value of the deceleration is greater than a first predetermined threshold value, wherein the internal temperature of the diesel particulate filter is reduced by decreasing a predetermined threshold value of a temperature control set point of the diesel particulate filter when the value of the deceleration is greater than the first predetermined threshold value but smaller than a second predetermined threshold value.

5. An aftertreatment system comprising:
    a diesel particulate filter;
    an object-detecting device; and
    an electronic control unit, when executing a computer program having program code is configured to:
    start a regeneration event of the diesel particulate filter;
    detect the presence of an object ahead of the automotive system;
    determine a value of a deceleration that the automotive system should perform in order to avoid a collision with said object, wherein the value of the deceleration is determined by determining a value of a distance between the automotive system and said object; determining a value of a current speed of the automotive system; determining a rate of distance between the automotive system and said object; and calculating the value of the deceleration based on the distance value, the current speed value and the rate of distance value; and
    reduce an internal temperature of the diesel particulate filter when the value of the deceleration is greater than a first predetermined threshold value, wherein the internal temperature of the diesel particulate filter is reduced by decreasing a predetermined threshold value of a temperature control set point of the diesel particulate filter when the value of the deceleration is greater than the first predetermined threshold value but smaller than a second predetermined threshold value.

* * * * *